Patented Oct. 3, 1933

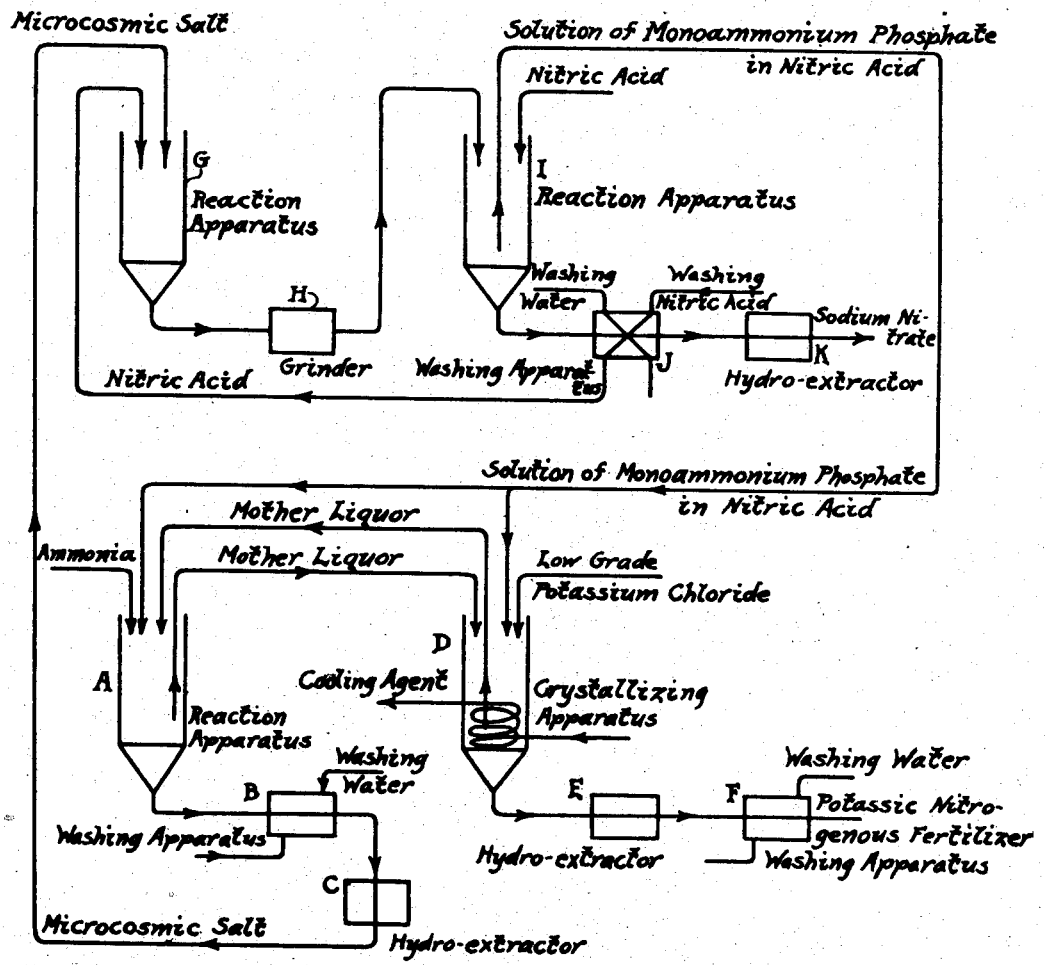

1,929,002

UNITED STATES PATENT OFFICE 1,929,002

PROCESS FOR THE MANUFACTURE OF SODIUM NITRATE AND OTHER FERTILIZING SUBSTANCES

Ferdinand Mitteau, Villemomble, France, assignor to Société d' Etudes Scientifiques et d' Entreprises Industrielles, Ougree, Belgium, a firm Application February 12, 1931, Serial No. 515,422, and in Germany February 17, 1930

12 Claims. (Cl. 71—9)

This invention relates to a process for the manufacture of sodium nitrate and other fertilizing substances.

It has already been proposed to make ammonium phosphate together with other fertilizing substances by a process consisting in dissolving sodium ammonium phosphate (microcosmic salt) in nitric acid, in cooling the solution or allowing it to cool, in order to cause on the one hand the crystallization of monoammonium phosphate and to obtain on the other hand a liquor from which sodium nitrate or fertilizing substances containing sodium nitrate may be produced.

The present invention relates to another process of attacking microcosmic salt by nitric acid.

Microcosmic salt is treated with nitric acid in the ratio of approximately one molecule of acid to one molecule of double salt, then the mass is concentrated either in a vacuum or preferably by heating it. By heating there is obtained both the complete dissolution of the salt in the acid and the elimination of the greater part of the water. When a sufficient temperature, in practice a temperature near 145° C. when working under atmospheric pressure, has been reached, the heating is interrupted and the solution allowed to cool, said solution setting then and forming a mass. After cooling, said mass is crushed and taken up again with a new quantity of nitric acid. The nitrate of sodium which has been formed remains undissolved and is separated from the mother liquor which substantially consists of a nitric acid solution of ammoniacal phosphate. The crystals of sodium nitrate which have been thus separated are now washed first with nitric acid and then with water in order to obtain a pure product free of phosphoric acid.

The mother liquors from the separation of the sodium nitrate may be used in different ways.

For instance, if the sodium nitrate has been taken up again with a sufficient quantity of nitric acid, said mother liquors may be advantageously used for the attack of raw phosphate; in this way a phosphatic ammoniacal nitrogenous mixed fertilizer may be obtained, in which phosphorus and nitrogen are present in a soluble form and immediately assimilable by the plants.

The mother liquors may also be cooled to the surrounding temperature or to a lower temperature if a cooling medium is available; thus a considerable precipitation of crystals is obtained, said crystals being almost exclusively formed of monoammonium phosphate which may be easily transformed into diammonium phosphate by a subsequent treatment with ammonia.

The mother liquors may be also saturated with ammonia; thus a solution of ammonium nitrate and diammonium phosphate is obtained, from which a mixture of both salts may be obtained by crystallization.

However, a particularly interesting method of utilization of the mother liquors consists in using them as a source of phosphoric acid in the process for making successively microcosmic salt and ammonium chloride which consists in treating a solution of sodium chloride with diammonium phosphate or successively with phosphoric acid and then with ammonia until a neutral liquor has been obtained. More particularly said mother liquors may be taken as source of phosphoric acid in that form of execution of said process which is described in the co-pending U. S. application Serial No. 434,453 and consists in starting from a solution containing potassium chloride besides sodium chloride, for example from a solution of commercial potassium chloride of a low grade, the liquor from which the microcosmic salt has just been separated being on occasion acidified. According to such an acidification not taking place or on the contrary taking place, the nitric acid solution of monoammonium phosphate will be added in totality or only for the greater part immediately before the neutralization with ammonia which causes the crystallization of microcosmic salt to take place. In this second case the remaining part of the nitric acid solution of monoammonium phosphate is added as acidifying liquor after the separation of the microcosmic salt.

The manner in which the process may be carried into effect in the latter case will now be described.

On beginning with the operations with a view to start the process, a solution of commercial potassium chloride or of sylvinite is treated with phosphoric acid in the ratio of one molecule of phosphoric acid to one molecule of dissolved sodium chloride, then the acid solution is treated with gaseous ammonia or an ammoniacal solution until a complete neutralization is obtained; the liquor gets warm, and care must be taken at the end of the treatment that the heating which is thus produced be limited, so that the temperature may not rise above 50 to 60° C. and losses of ammonia be avoided. When the saturation is complete the mass is cooled or allowed to cool down to the ordinary temperature and then microcosmic salt crystallizes out. It is separated from the mother liquor and washed in order to displace the mother liquor which adheres on to the crystals. Said microcosmic salt is then submitted to the above described treatment with nitric acid; sodium nitrate and a nitric acid solution of monoammonium phosphate are thus obtained. For this treatment, two successive quantities of nitric acid are used, as mentioned above. The first quantity is equivalent to that of the sodium of the microcosmic salt. The second is here advantageously equivalent to the quantity of potassium introduced into the process as potassium chloride of a low grade or sylvinite as hereinafter described.

On the other hand a certain quantity of potassium chloride of low grade or sylvinite is added to the mother liquor from the separation of the microcosmic salt. Said quantity is so calculated that the quantity of sodium which it contains is exactly equal to that which has just been separated as microcosmic salt, that is, is equivalent to the above-mentioned first quantity of nitric acid. Approximately 15% of the nitric acid solution of monoammonium phosphate are also added in order to avoid the crystallization of microcosmic salt in admixture with the nitrogenous potassium fertilizer during the cooling hereinafter mentioned. The mass is then moderately heated in order to cause the total dissolution of the potassium salt, after which it is allowed to crystallize by cooling.

Said cooling may be performed in two phases. If the cooling is interrupted at a suitable temperature which may vary with the concentration of the liquor and which generally will be of about 25° C., potassium nitrate crystallizes alone and may be separated from the solution. Thus part of the potash is obtained as substantially pure nitrate. The cooling process is then continued, the cold produced by the vaporization of liquid ammonia being utilized, if liquid ammonia is available. A nitric ammoniacal potassium fertilizer then crystallizes. If the second quantity of nitric acid used for attacking the microcosmic salt has been taken as above mentioned, the ammoniacal potassium fertilizer substantially consists of a mixture of potassium nitrate and ammonium chloride. If said second quantity of nitric acid has been taken otherwise the ammoniacal potassium fertilizer will also contain ammonium nitrate or potassium chloride.

The quantity of nitrogenous potassium fertilizer thus obtained will be the greater, the lower the cooling of the liquor has been. It is therefore advantageous to cool the liquor to a temperature as low as possible, said cooling being however interrupted when a temperature is reached at which appreciable quantities of alkaline phosphate could crystallize with the fertilizing mixture. Generally said temperature will be near 0° C., but it can vary with the concentration of the mother liquors and with the temperature at which the microcosmic salt has been caused to crystallize.

The mother liquors from the separation of the nitroammoniacal-potassium fertilizer are added to the not yet used 85% of the nitric acid solution of monoammonium phosphate obtained by the above mentioned action of nitric acid on the microcosmic salt. An acid solution is thus obtained. Said solution is neutralized with ammonia; a new quantity of microcosmic salt crystallizes, which is in turn attacked by nitric acid in order to obtain a new quantity sodium nitrate and again a nitric acid solution of monoammonic phosphate and so on in a closed cycle.

It is obvious that with the above described cyclic process starting from sylvinite, nitric acid and ammonia only, there are obtained practically pure sodium nitrate on the one hand and a nitrogenous ammoniacal potassium fertilizer free of sodium, and on occasion substantially pure potassium nitrate, on the other hand.

An example of carrying out the process will now be given with reference to the appended drawing.

*First phase.*—To 2,000 liters of mother liquor from the separation of the fertilizing mixture, carried out in a preceding process, there are added in the reaction apparatus A 510 liters of nitric acid solution of ammonium phosphate, which represent 85% of 600 liters of the nitric acid and phospho-ammoniacal mother liquor obtained in the reaction apparatus I and resulting from the second phase of the hereinafter described treatment. The liquor is then saturated with gaseous ammonia till neutral to phenolphthalein and then allowed to cool to 20° C.

Thus 400 kilograms of sodium ammonium phosphate which are washed in the washing apparatus B with about 25 liters of water, on the one hand, and 2,200 liters of mother liquor, on the other hand, are obtained. To said mother liquor 500 kilograms of potassium chloride with 49% $K_2O$ and the remaining part, i. e. 90 liters of the above mentioned nitric acid and phospho-ammoniacal mother liquor obtained in the reaction apparatus I, the total volume of which was 600 liters, are now added.

The whole is then heated to 50° C. in order to dissolve all the chloride, after which it is cooled to 5° C.; a mixed salt then separates, which is drained in the hydroextractor E and slightly washed in the washing apparatus F. The product thus obtained consists of 900 kilograms of a nitro-potassium fertilizer containing when dry:

|  | Per cent |
|---|---|
| Nitric N | 8 |
| Ammoniacal N | 10.3 |
| $K_2O$ | 25 | on the one hand, and 2,000 liters of mother liquor, on the other hand, which are used again in the cycle which has just been described, that is, are introduced for the greater part into the reaction apparatus A and for the remaining part into the crystallizing apparatus.

*Second phase.*—The 400 kilograms of microcosmic salt are drained in the hydroextractor C, after which they are treated in the reaction apparatus G with 145 liters of nitric acid of 39° Bé. or with the equivalent quantity of nitric acid of another density. The mass is then heated in order to concentrate it, till a temperature of 145° C. is reached. The mass is then cooled, ground in the grinding device H and taken up in the reaction apparatus I with 385 liters of nitric acid of 39° Be. and cooled to 10° C. The liquid floating on the sodium nitrate is then poured off and the remaining sodium nitrate is washed in the washing apparatus J with 145 liters of nitric acid which will be used for attacking a new mass of microcosmic salt in the reaction apparatus G. The nitrate is then washed with 20 liters of water and thoroughly drained in the hydroextractor K; 140 kilograms of sodium nitrate with a purity of 98–99% on the one hand and 600 liters of mother liquor on the other hand are thus obtained. As above mentioned said 600 liters of mother liquor are used again in the reaction apparatus A in the first phase of the process which has just been described.

The proportions indicated in the above described example are by no means absolutely necessary and may be varied between certain limits according to the grade of the chloride which is used, the concentration of the nitric acid, the temperature of crystallization and the like.

I claim:

1. A process for the manufacture of sodium nitrate, which comprises dissolving microcosmic salt in a quantity of nitric acid equivalent to the quantity of sodium contained in the microcosmic salt, concentrating the solution to dryness, treating the solid mass thus obtained with a further quantity of nitric acid, and removing the solid part, which consists of sodium nitrate.

2. A process for the manufacture of sodium nitrate, which comprises treating microcosmic salt with a quantity of nitric acid equivalent to the quantity of sodium contained in the microcosmic salt, heating the mixture, allowing it to cool, treating the solid mass thus obtained with a further quantity of nitric acid, and removing the solid part, which consists of sodium nitrate.

3. A process for the manufacture of sodium nitrate, which comprises dissolving microcosmic salt in a quantity of nitric acid equivalent to the quantity of sodium contained in the microcosmic salt, concentrating the solution thus formed by heating it to about 145° C., allowing it to cool, grinding the solid mass thus obtained, treating it with a further quantity of nitric acid, and removing the solid part, which consists of sodium nitrate.

4. A process for the manufacture of sodium nitrate, which comprises dissolving microcosmic salt in a quantity of nitric acid equivalent to the quantity of sodium contained in the microcosmic salt, concentrating the solution to dryness, treating the solid mass thus obtained with a further quantity of nitric acid, removing the solid part, which consists of sodium nitrate, and washing it successively with nitric acid and water.

5. A process for the manufacture of sodium nitrate and an ammoniacal fertilizer, which comprises dissolving microcosmic salt obtained in a previous cycle of operation in a quantity of nitric acid equivalent to the quantity of sodium contained in the microcosmic salt, concentrating the solution to dryness, treating the solid mass thus obtained with a further quantity of nitric acid, removing the solid part, which consists of sodium nitrate, mixing the mother liquor with a sodium chloride-containing mother liquor obtained in a previous cycle of operation as the mother liquor of the crystallization of the ammoniacal fertilizer, neutralizing with ammonia the mixture of both mother liquors, removing the crystallized microcosmic salt, treating the resulting mother liquor with such a quantity of a sodium chloride-containing substance that the quantity of the sodium chloride contained therein is equivalent to that of the treated microcosmic salt, cooling the mother liquor, and removing the crystallized ammoniacal fertilizer from the resulting sodium chloride-containing mother liquor.

6. A process for the manufacture of sodium nitrate and an ammoniacal fertilizer, which comprises dissolving microcosmic salt obtained in a previous cycle of operation in a quantity of nitric acid equivalent to the quantity of sodium contained in the microcosmic salt, concentrating the solution to dryness, treating the solid mass thus obtained with a further quantity of nitric acid, removing the solid part, which consists of sodium nitrate, dividing the mother liquor into two unequal parts, mixing the larger one with a sodium chloride-containing mother liquor obtained in a previous cycle of operation as the mother liquor of the crystallization of the ammoniacal fertilizer, neutralizing with ammonia the mixture of both mother liquors, removing the crystallized microcosmic salt, treating the resulting mother liquor with the smaller quantity of the mother liquor from the separation of the sodium nitrate and with such a quantity of a sodium chloride-containing substance that the quantity of the sodium chloride contained therein is equivalent to that of the treated microcosmic salt, cooling the resulting mother liquor, and removing the crystallized nitrogenous fertilizer from the resulting sodium chloride-containing mother liquor.

7. A process as set forth in claim 5, in which the sodium chloride-containing substance consists substantially of a mixture of sodium chloride and potassium chloride, such as sylvinite or potassium chloride of a low grade.

8. A process as set forth in claim 6, in which the sodium chloride-containing substance consists substantially of a mixture of a sodium chloride and potassium chloride, and the second of both the quantities of nitric acid successively used for the treatment of the microcosmic salt is equivalent to the quantity of the potassium chloride contained in the mixture of sodium chloride and potassium chloride.

9. A process as set forth in claim 6, in which the sodium chloride-containing substance consists substantially of a mixture of sodium chloride and potassium chloride, and the cooling of the mother liquor after addition of said substance is effected in two steps, the first cooling step being carried out to such an extent as to cause substantially pure potassium nitrate to crystallize, the said potassium nitrate being removed before further cooling the solution.

10. A process for the manufacture of sodium nitrate, which comprises dissolving microcosmic salt in a quantity of nitric acid equivalent to the quantity of sodium contained in the microcosmic salt, concentrating the solution to dryness, treating the solid mass thus obtained with a further quantity of nitric acid, removing the solid part, which consists of sodium nitrate, and treating raw phosphate with the mother liquor for the removal of the sodium nitrate.

11. A process for the manufacture of sodium nitrate and mono-ammonium phosphate, which comprises dissolving microcosmic salt in a quantity of nitric acid equivalent to the quantity of sodium contained in the microcosmic salt, concentrating the solution to dryness, treating the solid mass thus obtained with nitric acid, removing the solid part, which consists of sodium nitrate, cooling the mother liquor, and removing the crystallized salt, which consists of mono-ammonium phosphate.

12. A process for the manufacture of sodium nitrate and an ammoniacal phosphatic fertilizer, which comprises dissolving microcosmic salt in a quantity of nitric acid equivalent to the quantity of sodium contained in the microcosmic salt, concentrating the solution to dryness, treating the solid mass thus obtained with nitric acid, removing the solid phase, which consists of sodium nitrate, saturating the mother liquor with ammonia, and causing the dissolved mixture of ammonium nitrate and diammonium phosphate to crystallize out.

FERDINAND MITTEAU.